Minor & Ward,
Road Scraper,

N° 68,224.            Patented Aug. 27, 1867

Witnesses:
Theo Tusche
W<sup>m</sup> Truwrn

Inventors
John H. Minor
Dan'l P. Ward
Per Munn & Co
Attorneys

United States Patent Office.

JOHN W. MINOR AND DAVID P. WARD, OF NEW BEDFORD, MASSACHUSETTS.

Letters Patent No. 68,224, dated August 27, 1867.

IMPROVED MACHINE FOR FILLING RUTS AND LEVELLING ROADS.

The Schedule referred to in these Letters Patent and making part of the same.

TO ALL WHOM IT MAY CONCERN:

Be it known that we, JOHN W. MINOR and DAVID P. WARD, of New Bedford, in the county of Bristol, and State of Massachusetts, have invented a new and useful improvement in Machine for Filling Ruts and Levelling Roads; and we do hereby declare that the following is a full, clear, and exact description thereof, which will enable others skilled in the art to make and use the same, reference being had to the accompanying drawings, forming part of this specification.

This invention consists in attaching to a suitable frame a pair of coulters or shares, and a pair of scrapers and a heavy roller, whereby the ridges in the road are cut up, and the earth loosened and scraped into the rut by the scrapers, and then the earth is rolled down level by the heavy roller, the parts being constructed and arranged as hereinafter described.

Figure 1:
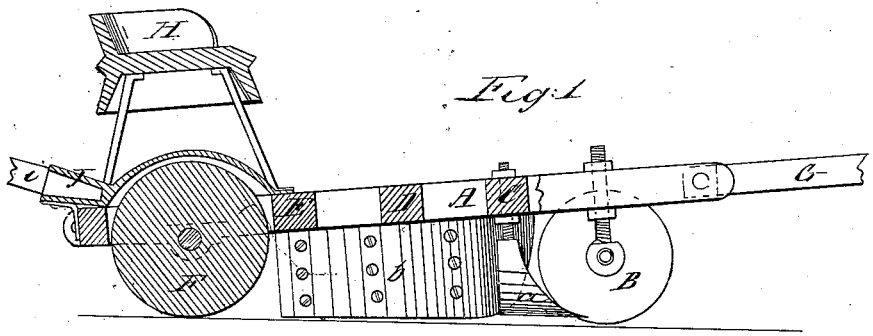
Figure 2:
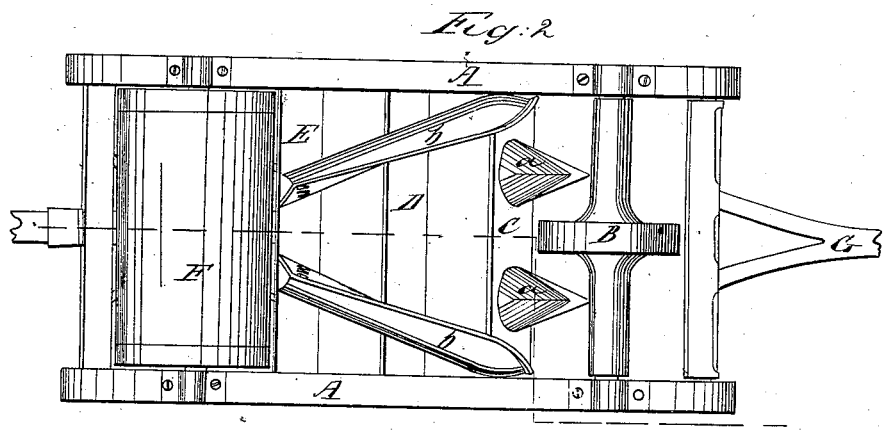

Figure 1 represents a side view of the machine, and
Figure 2 a view of the bottom side of the machine.
Similar letters of reference indicate like parts.

A represents a rectangular-shaped frame, to which the parts of the machine are attached. B is a guide-wheel, which is made fast to an axle, which axle revolves in boxes on the under side of the frame, as seen in the drawing. This wheel runs in the rut when the machine is in operation. C is a cross-piece, to which are attached by shanks two coulters or shares, $a\ a$, of a form similar to a double mould-board plough, as seen in the drawing. D and E represent two more cross-pieces, which connect the side pieces of the frame together, to which are attached the scrapers $b\ b$, which are somewhat curved in form, and which are designed, by their peculiar position, to scoop the earth which has been loosened by the small shares $a\ a$ into the rut. It will be noticed that the forward ends of these scrapers are spread apart so that they enclose the shares $a\ a$ and draw the earth, by their inclined or diagonal position, towards the centre, and deposit it in the rut, as the machine moves over the ground. F is a heavy roller, which revolves on journals, as seen in the drawing. This roller may be made of one piece or in sections, of either wood or iron. The driver's seat is arranged over this roll, as seen in fig. 1. The coulters or shares $a\ a$ and the guide-wheel B are attached to the frame by screw-rods or shanks, and with screw-nuts on both sides of the frame, arranged in such a manner that they can be adjusted to any desired depth. G is the tongue, to which the team is attached which operates the machine. J is a socket in the rear of the machine, and $i$ is a section of a lever therein. The weight of the machine being mostly in the heavy roller F, a slight exertion of force on the lever $i$ will serve to raise the front of the machine, the roller F being a fulcrum for that purpose. H is the driver's seat. Guide-rollers may be attached to the frame in any manner, to keep the forward part of the machine steady, and govern its distance from the ground, should the same be deemed necessary.

In this manner the ridges will be cut down, and the earth scraped into the rut, and the surface rolled down hard and smooth, all in one operation.

What we claim as new, and desire to secure by Letters Patent, is—

1. The combination and arrangement, substantially as described, of the guide-wheel B, the coulters or shares $a\ a$, the scrapers $b\ b$, the lever $i$, and the roller F, substantially as and for the purposes herein shown and described.

2. We claim the scrapers $b\ b$, in combination with the roller F, arranged substantially as described, with or without the guide-wheel B, and the coulters or shares $a\ a$.

The above specification of our invention signed by us this    day of May, 1867.

JOHN W. MINOR,
DAVID P. WARD.

Witnesses:
J. S. LUCE,
F. E. WARD.